United States Patent [19]
van der Plaats

[11] 3,973,082
[45] Aug. 3, 1976

[54] ELECTRONIC TELEPHONE SUBSCRIBER SET WITH VOLTAGE CONTROLLED VARIABLE SHUNT
[75] Inventor: Petrie Johan van der Plaats, Hilversum, Netherlands
[73] Assignee: U.S. Philips Corporation, New York, N.Y.
[22] Filed: Feb. 11, 1975
[21] Appl. No.: 548,997

[30] Foreign Application Priority Data
Feb. 26, 1974 Netherlands.................. 7402575

[52] U.S. Cl.............................. 179/81 R
[51] Int. Cl.².......................... H04M 1/00
[58] Field of Search............ 179/81 R, 81 A, 84 R, 179/16 E, 16 EA, 16 F, 170 NC, 170 T; 323/8, 22 T

[56] References Cited
UNITED STATES PATENTS
3,035,122  5/1962  Livingstone.................. 179/16 F
3,627,952  12/1971  Person......................... 179/16 F
3,800,095  3/1974  Cowpland...................... 179/16 F Primary Examiner—William C. Cooper
Assistant Examiner—Joseph A. Popek
Attorney, Agent, or Firm—Frank R. Trifari; Simon L. Cohen

[57] ABSTRACT

An electronic telephone subscriber set which is suitable for co-operation with a telephone exchange incorporating supply resistors, the values of which are substantially higher during the detection of the closed/non-closed conditions of a subscriber loop than during the speech condition and which is provided with an adjustable direct current resistor connected across the line connection terminals and a current detector coupled thereto for adjusting the direct current resistor to one of two values in dependence of the line current in order to enable optimum detection of the closed/non-closed conditions of the subscriber loop.

3 Claims, 3 Drawing Figures

ELECTRONIC TELEPHONE SUBSCRIBER SET WITH VOLTAGE CONTROLLED VARIABLE SHUNT

The invention relates to a telephone subscriber set which is suitable for co-operation with a telephone exchange incorporating supply resistors, the values of which are substantially higher during the detection of on hook/off hook conditions of a subscriber loop than during the speech condition. Such a subscriber set further comprises a pair of line connection terminals, an electronic signal circuit which is coupled to the terminals, and a direct current circuit which has an adjustable direct current resistance and which is connected parallel thereto.

The electronic signal circuit of the telephone subscriber set can be, for example, a speech signal amplifier or a tone pushbutton generator or a combination thereof. A telephone subscriber set comprising the latter signal circuit is known from the article "The use of Microcircuits in Telephone set Circuitry" by F. W. Carrol and M. C. Cowpland, published in "Telesis", September 1969, pages 179 to 185 inclusive. Telephone subscriber sets incorporating such electronic signal circuits have the drawback that a comparatively high direct voltage must be present across the connection terminals as the supply voltage for these circuits. Due to this high voltage between the connection terminals, the detection of the closing of the subscriber loop by the lifting of the receiver, is no longer possible for telephone subscriber sets connected to a telephone exchange by a maximum cable length which is determined by conventional telephone sets. In order to mitigate this drawback, it is known from the article to keep the voltage across the electronic signal circuit at a low value for 150 ms after the receiver has been lifted off the hook by means of a direct current circuit which is connected parallel to the circuit, and to make the direct voltage across the telephone set circuit equal the desired supply voltage again after the said period of time.

A telephone set of this kind is thus suitable for connection to a telephone exchange provided with supply resistors, the values of which are substantially higher during the detection of the subscriber loop conditions than during the speech condition.

However, it was found in practice that a closed subscriber loop is not detected on numerous occasions. This could be remedied by substantially increasing the time during which the direct voltage across the telephone set has a low value. The drawback thereof, however, is that this results in a long calling time.

The described drawbacks are mitigated according to the invention, which has for its object to combine an optimum chance of loop detection with an optimum short loop detection time.

The telephone subscriber set according to the invention is characterized in that the direct current circuit comprises a line current detector which is coupled to the adjustable direct current resistance to the lower of two different values for a line current smaller than a predetermined value, and to adjust the direct current resistance to the higher of the two different values for a line current larger than the predetermined value. For a telephone set connected to a telephone exchange the line current detector is then adjusted such that the current having the predetermined value corresponds to a loop current which is slightly larger than the loop current determined by the high supply resistances of the telephone exchange.

The invention and its advantages will be described in detail hereinafter with reference to the embodiments shown in the drawings, corresponding parts being denoted by the same references in the various figures.

Figure 1:
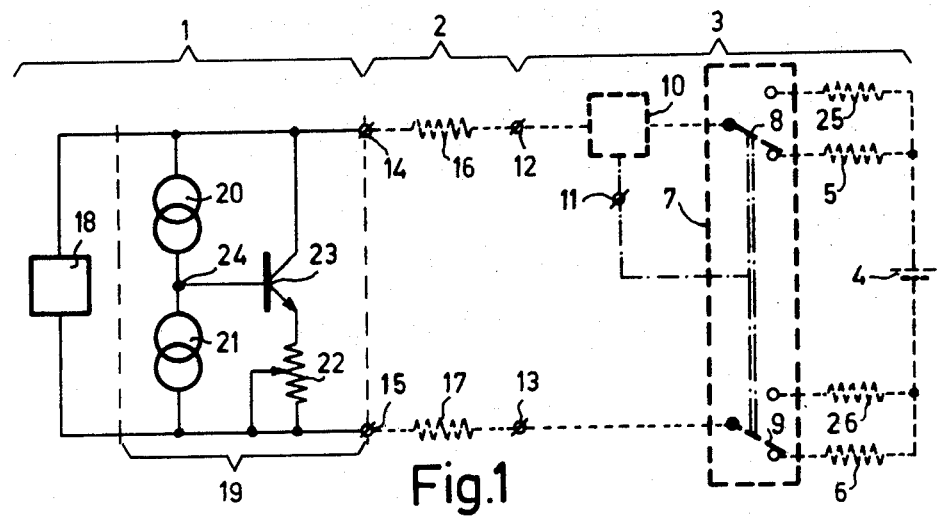
FIG. 1 shows an embodiment of a telephone set according to the invention and a portion of a telephone exchange whereto the telephone set is connected.

FIG. 1 shows a circuit for a telephone set 1 which is connected to a supply circuit 3 of a telephone exchange via a transmission line pair 2. The supply circuit 3 comprises a battery 4 of, for example, 48 volts. In the rest condition of the circuit, this battery 4 is connected to line connection terminals 12 and 13 of the transmission line pair 2 via high-ohmic supply resistors 5 and 6, having a combined resistance of 20 to 40 kohms, a switching device 7, comprising two interconnected make-and-break contacts 8 and 9, and a loop detector 10. The values of the resistors 5 and 6 are high to limit the losses of the transmission lines in the rest condition of the circuit. Furthermore, an output 11 of the loop detector 10 is coupled to the switching device 7 in order to change over the contacts 8 and 9 depending upon the current intensity in the subscriber loop.

If a conventional telephone set is connected to the connection terminals 14 and 15, when the hook contact is closed by the lifting of the receiver, a current will flow from the positive pole of battery 4, via the supply resistor 5, make-and-break contact 8, detector 10, a resistor 16, being the resistance of the transmission line connected between the connection terminals 12 and 14, a microphone, a resistor 17, being the resistance of the transmission line connected between the connection terminals 13 and 15, and make-and-break contact 9, to the negative pole of the battery 4.

The value of the loop current is then mainly determined by the resistors 5 and 6 and the resistors 16 and 17 because the microphone resistance amounts to only a few hundreds of ohms. The maximum permissible length of the transmission line pairs is given by the sensitivity of the loop detector 10 for detecting the above loop current. After detection, the loop detector 10 sets the make-and-break contacts 8 and 9 to the position not shown, with the result that the supply resistors 5 and 6 are disconnected and low-ohmic supply resistors 25 and 26 of, for example, 200 to 400 ohms each, and then included in the loop. As a result of these low resistances, the loop current then has a value such that the proper operation of the telephone set is not impeded.

If the conventional telephone set is replaced by a telephone set as shown in FIG. 1, comprising an electronic signal circuit 18, this circuit requires a supply voltage of 5 to 7 volts. Because of this high required supply voltage, it is no longer ensured that the loop detector 10 will be still actuated at the maximum length of the existing transmission line pairs, the length having been originally determined by the conventional sets. In order to mitigate this problem, it is known to connect a direct current circuit (not shown in the figures) parallel to the electronic signal circuit 18, immediately when the receiver is lifted off the hook, for a period of 150 ms, the said direct current circuit limiting the direct voltage between the connection terminals to a value which is low in comparison with the supply voltage required by the signal circuit. The chance that the loop detector 10 detects a closed subscriber loop is thus enhanced.

However, it was found that when the receiver of a telephone set which was connected to the telephone exchange via transmission line pairs of a maximum length is lifted off the hook, the loop detector 10 and subsequent equipment do not react within 150 ms. Consequently, due to the intermediate increasing of the voltage present between the connection terminals 14 and 15 by the telephone set, the detection circuit was not at all actuated, so that no connection was established. This can be avoided by substantially increasing the time during which the voltage present between the terminals 14 and 15 is limited. However, the establishment of connections then becomes very slow.

These drawbacks are mitigated by the telephone set according to the invention in that use is made of a direct current circuit 19 which is connected in parallel to the electronic signal circuit 18 and which comprises a line current detector 20, 21, 22 which is coupled to an adjustable direct current resistance 22, 23. The adjustable direct current resistance is formed by a series connection of current path of a main a transistor 23 and an adjustable resistor 22 connected between the connection terminals 14, 15. The line current detector is formed by the series connection of the current sources 20, 21, the base-emitter junction of transistor 23 and the resistor 22 connected parallel thereto, the control electrode of the transistor 23 being connected to a terminal 24 provided between the current sources 20 and 21.

The operation is as follows. After the closing of the hook contact (not shown) by the lifting of the receiver off the hook, a given small loop current flows which is determined by the supply resistors 5 and 6 and which activates the current source 20 in a manner yet to be described, but which is not capable of switching on the current source 21.

The loop current extracted by the current source 20 via connection terminal 14 in that case flows via the base-emitter junction of transistor 21 and the resistor 20 back to the exchange 3 via output terminal 15. This current saturates transistor 23, with the result that the resistor 22 is connected in parallel to the electronic signal circuit 18. The value of this resistor is as low as possible as will be explained hereinafter. The voltage drop caused across this resistor by the loop current, consequently, is also small. As a result, the loop detector 10 is always capable of detecting the closed condition of a subscriber loop of maximum length. After detection, the loop detector 10 sets the make-and-break contacts 8 and 9 to the position not shown. Because of the low values of the resistors 25 and 26, the loop current increasess and hence also the voltage across the resistor 22. When this increasing voltage reaches a given value, it switches on the current source 21 in a manner yet to be described. This current source is proportional such that the current supplied by this source equals at least the current supplied by the current source 20. Current is then no longer applied to the control electrode of the transistor 23, with the result that this transistor is cut off and the direct current resistance of the telephone set is determined by the resistance of the electronic signal circuit 18. The resistance of this circuit is so high that the desired supply voltage of, for example, 7 volts is realized thereacross by the loop current.

It appears from the foregoing on the one hand that the voltage drop occuring between the terminals 14 and 15 is minimized as long as the loop detector 10 has not yet detected the closed condition of a subscriber loop, thus ensuring optimum detection of the hook/off hook conditions of a subscriber loop. On the other hand, it was found that as soon as it has been detected that a subscriber loop is closed, the voltage between the terminals 14 and 15 increased as quickly as possible to the desired value of the supply voltage for the electronic signal circuit 18, thus ensuring an optimum short calling time in all cases.

A more detailed description of the direct current circuit 19 will be given with reference to the FIGS. 2 and 3.

Figure 2:
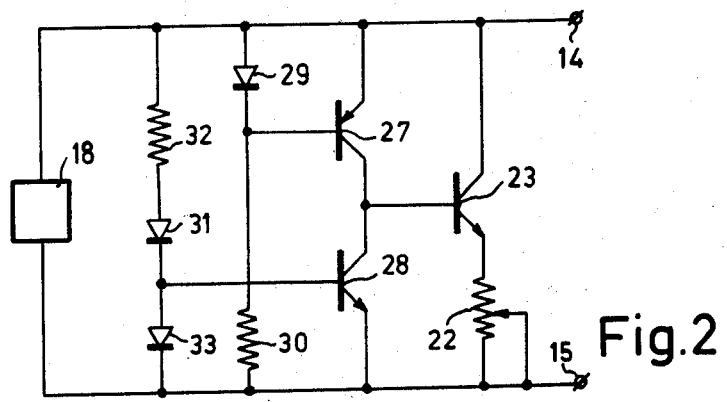
FIG. 2 is a detailed view of the embodiment of a telephone set shown in FIG. 1.
Figure 3:
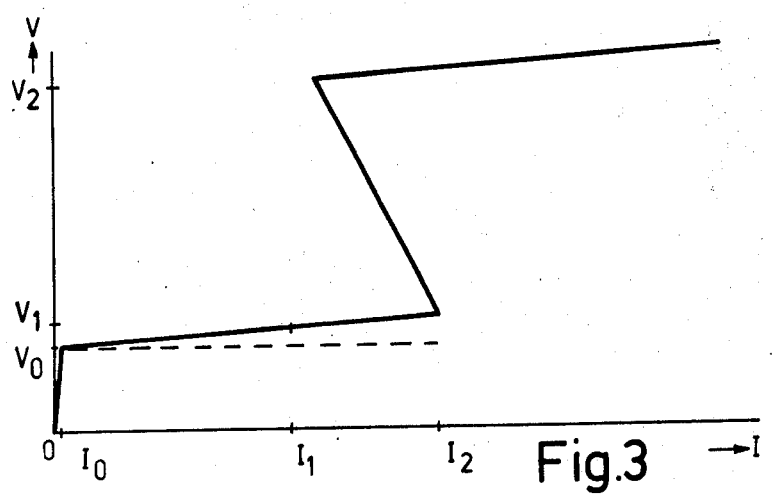
FIG. 3 shows a graph in which the direct voltage is plotted against the direct current occurring in the embodiment shown in the FIGS. 1 and 2.

FIG. 2 shows two main current paths of transistors 27 and 28 in a series connection between the connection terminals 14 and 15. The control electrode of transistor 27 is connected, via a diode 29 which is connected in the reverse direction, to connection terminal 14. The control electrode of transistor 27 is also connected via a resistor 30, to connection terminal 15. The transistor 27, the diode 29, and the resistor 30 constitute the current source 20 shown in FIG. 1. Furthermore, the control electrode of transistor 28 is connected, via a diode 31 which is connected in the reverse direction and a resistor 32, to connection terminal 14, and is also connected via a diode 33 which is connected in the forward direction, to connection terminal 15. The transistor 28, the diodes 31 and 33 and the resistor 32 constitute the current source 21 shown in FIG. 1.

When the receiver is lifted off the hook, the hook contact is closed. The voltage between the terminals 14 and 15 will then increase from zero volts to a value at which the diode 29 as well as the base-emitter junction of transistor 27 start to conduct current. The transistor 27 is thus rendered conducting. The current flowing via the main current path of transistor 27 can be depleted only via the base-emitter junction of transistor 23. This transistor 23 is thus rendered conducting. Immediately after the closing of the hook contact, the value of the voltage between the connection terminals 14 and 15 equals the emitter-collector voltage of transistor 27, increased by the base-emitter voltage of transistor 23. This voltage is represented at $I = I_o$ by $V_o$ in the graph of FIG. 3 in which the voltage V between the connection terminals 14 and 15 is plotted as a function of the loop current I. The current I in the subscriber loop further increases further to the value of $I_1$ determined by the resistors 5 and 6 and the supply voltage source 4 and the line resistors 16 and 17. Due to this increase of the line current, transistor 27 saturates transistor 23, with the result that substantially the complete loop current $I_1$ flows through the resistor 22. The voltage V between the connection terminals 14 and 15 then equals the voltage $V_o$, increased by the product of the line current $I_1$ and the value of resistor 22. The said voltage V being denoted by $V_1$ in FIG. 3. It is to be noted that, because of the fact that the value of the resistor 22 is chosen to be as small as possible, the voltage V between the connection terminals 14 and 15 cannot exceed the forward voltage of the diodes 31 and 33 for the current $I_1$.

After detection of this loop current, the loop detector 10 switches the supply resistors from a high to a low value, with the result that the loop current, and hence the voltage across the resistor 22, increases further. The value of resistor 22 is at least so high that, before the loop current reaches its maximum value under the most unfavorable circumstances, the voltage drop caused across this resistor by the increasing loop current is larger than the sum of the forward voltages of the diodes 31 and 33. When the loop current I has increased so far that the diodes 31 and 33 become conducting, the base emitter junction of transistor 28 also becomes conducting. If the loop current I further increases, the transistor 28 is saturated. The values of the currents flowing through the transistors 27 and 28 are determined by the values of the resistors 30 and 32. The value of the resistor 32 is chosen to be smaller than the value of resistor 30. As a result, as of the instant at which the diodes 31 and 33 become conducting in the case of an increasing loop current, the current flowing through the transistor 28 will increase to a value which is higher than that of the current flowing through transistor 27. At a given value $I_2$ of the loop current I, the currents flowing through the two transistors 27 and 28 will be equally large. A base current is then no longer applied to transistor 23, with the result that this transistor is cut off. The voltage V between the connection terminals 14 and 15 will immediately start to increase to value of the supply voltage which is determined by the direct current resistance of the electronic signal circuit 18 and which is denoted by $V_2$ in FIG. 3. The current subsequently increases further to the value of at least 15 to 20 mA which is determined by all resistors present in a subscriber loop and the battery 4. The voltage V present between the terminals 14 and 15, consequently, also increases to the value of the supply voltage ultimately desired for the said current through the electronic signal circuit 18.

It was demonstrated in the foregoing description that a telephone set provided with a direct current circuit, in co-operation with a telephone exchange whose supply resistors are substantially higher during the detection of the closed condition of the subscriber loop than the supply resistors during the speech condition, at all times combines an optimum chance of loop detection with an optimum short loop detection time.

What is claimed is:

1. A telephone subscriber set which is suitable for co-operating with a telephone exchange incorporating supply resistors, the values of which are substantially higher during the detection of on hook/off hook conditions of a subscriber loop and substantially lower during speech conditions, comprising a pair of line connection terminals connected to said telephone exchange supply resistors, an electronic signal circuit means coupled to said terminals for providing audio frequency signals and for providing on hook/off hook resistances across said terminals, first voltage controlled means connected in parallel with said line connection terminals for providing a first output signal level in response to a first voltage across said terminals corresponding to an on hook condition of said electronic signal circuit and for providing a second output signal level in response to a rise in said voltage across said terminals to a second voltage corresponding to said off hook condition of said electronic signal circuit concurring with said higher valued telephone exchange supply resistors connected to said terminals, second voltage controlled means connected in parallel with said terminals for providing a third signal level in response to a third voltage across said terminals higher than said first and second voltage and corresponding to an off hook condition of said subscriber loop with said substantially lower valued telephone exchange supply resistors connected to said terminals and for providing a fourth signal level in response to a voltage across said terminals exceeding said third voltage, and signal controlled resistor means connected in parallel with said terminals and connected to said first and second voltage controlled means for providing a first high resistance across said terminals in response to a concurrence of said first and said third signal levels and for providing a resistance across said terminals substantially lower than said first resistance in response to a concurrence of said second and third signal levels and for providing a third resistance across said terminals substantially higher than said second resistance in response to a concurrence of said second and fourth signal levels.

2. A telephone subscriber set as recited in claim 1, wherein said signal controlled resistor means comprises a first transistor having a base, an emitter and a collector, and a first resistor connected in series with said collector-emitter terminals of said first transistor across said terminals, wherein said first and second voltage controlled means each comprise a separate voltage controlled current source connected to said first terminals and connected in common to the base of said transistor, said voltage controlled current sources providing dc currents in opposite directions to said base of said first transistor in response to said first, second, third and fourth signal levels.

3. A telephone subscriber set as recited in claim 2, wherein said first voltage controlled means comprises a second resistor, a first diode connected in series with said second resistor across said terminals, a second transistor having a base, an emitter and a collector, the base of said second transistor being connected on a side of said diode remote from said terminals, wherein said second voltage controlled current source comprises a second diode, a third resistor connected in series with said second diode across said terminals, a third transistor having a base, a collector and an emitter, said base of said third transistor being connected to a side of said second diode remote from said terminals, means connecting the collector-emitter paths of said second and third transistors in series across said terminals, and means connecting the base of said first transistor to each of said terminals through the collector-emitter paths of said second and third transistors.

* * * * *

UNITED STATES PATENT AND TRADEMARK OFFICE
CERTIFICATE OF CORRECTION

PATENT NO. : 3,973,082
DATED : August 3, 1976
INVENTOR(S) : PETRIE JOHAN VAN DER PLAATS It is certified that error appears in the above-identified patent and that said Letters Patent are hereby corrected as shown below:

Col. 2, line 54, "and" should be --are--;

Col. 3, line 59, "increasess" should be --increases--;

Col. 4, line 9, "hook/off" should be --on hook/off--;

Signed and Sealed this

Nineteenth Day of October 1976

[SEAL]

Attest:

RUTH C. MASON
Attesting Officer

C. MARSHALL DANN
Commissioner of Patents and Trademarks